Patented July 12, 1927.

1,635,273

UNITED STATES PATENT OFFICE.

ELAM G. HESS, OF MANHEIM, PENNSYLVANIA.

FOOD PRODUCT.

No Drawing. Application filed August 5, 1926. Serial No. 127,484.

My invention relates to an improved food product. The object of the invention is to provide a product from nut kernels, which shall retain the flavor of the nut unimpaired and shall also contain all the important elements of the nut, such as the protein fat or oil, the lime, iron, vitamins, etc., contained in the nut kernel itself, which requires no mastication and which is easily assimilated by the digestive organs. The product is especially applicable to nuts having hard kernels, such as pecan nuts, which must ordinarily be thoroughly masticated, in order that the same shall not be injurious to the digestive system.

The product comprises a flaky meal, produced by flaking or otherwise separating small particles, or shavings of uniform thickness, from the nut kernel and permitting or causing the separated flake like particles to fall away from the body of the kernel, into a loose mass, free from any pressure, other than atmospheric pressure; that is, especially free from mechanical pressure.

If the flakes, after separation from the kernel, were subjected to pressure, they would tend to agglomerate and, on account of the oil contained therein, to form a viscous body which would not be so readily affected by the saliva and therefore not readily assimilated.

As above stated, in the loose flaky condition, the product needs no mastication, and readily dissolves in the saliva.

The product may be produced by pressing the kernels against a moving foraminous surface, such for instance as a wire mesh screen, and permitting the resulting flakes, thereby separated, to fall by gravity, flake by flake, from the body of the kernel, through the atmosphere, into a loose unconfined mass, free from all mechanical pressure.

The product is then loosely packed in containers under the vacuum process, and may be used either alone, or with other ingredients, as a wholesome and nutritious food which is easily digested.

What I claim is:

1. A food product comprising flaky particles of substantially uniform thickness separated from pecan nuts and formed into a loosely associated mass.

2. A pecan-nut food product composed of a loose mass of flaky particles of substantially uniform thickness.

ELAM G. HESS.